United States Patent
Oosawa et al.

(10) Patent No.: US 7,834,635 B2
(45) Date of Patent: Nov. 16, 2010

(54) CAR POWER SOURCE APPARATUS

(75) Inventors: Takeshi Oosawa, Takasago (JP); Kimihiko Furukawa, Kakogawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 695 days.

(21) Appl. No.: 11/905,058

(22) Filed: Sep. 27, 2007

(65) Prior Publication Data

US 2008/0079434 A1    Apr. 3, 2008

(30) Foreign Application Priority Data

Sep. 30, 2006    (JP)    ............................. 2006-270189

(51) Int. Cl.
*G01N 27/416*    (2006.01)
*H02J 7/00*    (2006.01)

(52) U.S. Cl. ........................ 324/429; 324/426; 324/434; 320/104; 320/116; 320/162

(58) Field of Classification Search .................. 324/429
See application file for complete search history.

(56) References Cited

U.S. PATENT DOCUMENTS 6,104,164 A * 8/2000 Iino et al. ................... 320/116
6,919,706 B2 * 7/2005 Furukawa ................... 320/116

FOREIGN PATENT DOCUMENTS

JP    2006-025501    1/2006

* cited by examiner

*Primary Examiner*—Edward Tso
*Assistant Examiner*—Johali A Torres Ruiz
(74) *Attorney, Agent, or Firm*—Wenderoth, Lind & Ponack, L.L.P.

(57)    ABSTRACT

The car power source apparatus is provided with a driving battery 1 that supplies power to the car's electric motor, a voltage detection circuit 3 that measures the voltage of batteries 2 in the driving battery 1, a plurality of voltage detection lines 8 connected in parallel between the input-side of the voltage detection circuit 3 and driving battery 1 voltage detection nodes 9, and a decision circuit 6 that determines if a voltage detection line 8 is open circuited from the voltage measured by the voltage detection circuit 3. Each voltage detection line 8 has a voltage drop resistor 10 connected in series. The voltage detection circuit 3 is provided with input resistors 13 on its input-side. The car power source apparatus makes computations on the voltage measured by the voltage detection circuit 3, which is from the voltage divider formed by the input resistor 13 and voltage drop resistors 10, to detect voltage detection line 8 open circuit.

13 Claims, 2 Drawing Sheets

CAR POWER SOURCE APPARATUS

BACKGROUND OF THE INVENTION

1. Field of the Invention

This invention relates to a power source apparatus that powers a motor to drive an electric vehicle such as a hybrid car or electric automobile, and relates to a car power source apparatus having a simple circuit structure that can detect an open circuit in a voltage detection line for detecting battery module voltage.

2. Description of the Related Art

A power source apparatus that powers an electric vehicle detects battery voltage and controls charging and discharging to prevent over-charging and over-discharging of the driving battery. This is because over-charging and over-discharging degrade battery electrical characteristics and shorten battery lifetime. A car power source apparatus has been developed (Japanese Patent Application Disclosure 2006-25501) to prevent battery over-charging and over-discharging by detecting driving battery voltage and controlling battery charging and discharging.

The car power source apparatus cited in disclosure 2006-25501 detects voltage via a voltage detection circuit on the battery-side and on the output-side of contactors connected to the output-side of the driving battery. The car power source apparatus detects contactor voltage on the battery-side and on the output-side to determine if a contactor has fused closed. Contactors are controlled by a control circuit. When the car is driven, a main switch, which is the ignition switch, is on and contactors are switched to the off state when the ignition switch is turned off. Contactors are switched on by the control circuit when the ignition switch is turned on; namely, when car is driven. A contactor that has fused closed does not switch to the off state even if the control circuit switches it off. Therefore, when the control circuit controls the contactors off, a fused contactor can be detected by measuring voltages at the output-sides of the contactors.

It is a requirement that the voltage detection circuit reliably detect driving battery voltage when the contactors are switched on and the car is being driven. This is because the condition of the driving battery cannot be determined if driving battery voltage cannot be detected. To detect driving battery voltage, the input-side of the voltage detection circuit is connected to driving battery voltage detection nodes via voltage detection lines. If a voltage detection line becomes open circuited, voltage detection node voltage is not input to the voltage detection circuit, and driving battery voltage cannot be detected. If voltage cannot be detected, the control circuit switches the contactors off. In this state, the driving battery cannot drive the car even if the condition of the driving battery is normal. The detrimental result that voltage cannot be detected if a voltage detection line is open circuited can be resolved by connecting the input-side of the voltage detection circuit to voltage detection nodes in the driving battery via a plurality of voltage detection lines. In a car power source apparatus with this circuit structure, it is important to determine if each voltage detection line is properly connected during the manufacturing process. This is because if any voltage detection line is open circuited at the time of manufacture, the car will not be able to be driven if remaining line(s) become open circuited when operated by the user.

A car power source apparatus provided with a plurality of voltage detection lines can make decisions by detecting the voltage on each voltage detection line via the voltage detection circuit. This is because no voltage is measured by the voltage detection circuit on an open circuited voltage detection line. However, to detect voltage at one voltage detection node in the driving battery with this circuit structure, it is necessary to detect voltage at a plurality of points corresponding to the number of voltage detection lines. This results in a complex circuit structure. For example, in an apparatus that detects driving battery voltage via two voltage detection lines, voltage must be detected at twice as many voltage detection points.

The present invention was developed with the object of further resolving these drawbacks Thus it is an object of the present invention to provide a car power source apparatus that can detect voltage detection line open circuit, and determine if it impedes voltage detection. Furthermore, this is done with an extremely simple circuit structure by detecting open circuit for a plurality of voltage detection lines while measuring one voltage.

SUMMARY OF THE INVENTION

The car power source apparatus of the present invention is provided with a driving battery 1 that supplies power to the car's electric motor, a voltage detection circuit 3 that measures the voltage of batteries 2 in the driving battery 1, a plurality of voltage detection lines 8 connected in parallel between the input-side of the voltage detection circuit 3 and driving battery 1 voltage detection nodes 9, and a decision circuit 6 that determines if a voltage detection line 8 is open circuited from the voltage measured by the voltage detection circuit 3. Each voltage detection line 8 has a voltage drop resistor 10 connected in series. The voltage detection circuit 3 is provided with input resistors 13 on its input-side. The car power source apparatus computes voltage measured by the voltage detection circuit 3, which is from the voltage drop resistor 10 and input resistor 13 voltage divider, to determine voltage detection line 8 open circuit.

The car power source apparatus above can determine voltage detection line open circuit for a plurality of lines with one voltage measurement. This is because the car power source apparatus of the present invention measures voltage at voltage detection nodes with a voltage drop resistor connected in series with each voltage detection line and with a voltage detection circuit having input resistors on its input-side.

The principle by which the car power source apparatus above determines open circuit for a plurality of voltage detection lines while measuring voltage at one voltage detection node is described based on FIG. 1. In this car power source apparatus, the output-side of the driving battery 1 is connected to the input-side of the voltage detection circuit 3 via two voltage detection lines 8. When neither of the two voltage detection lines 8 is open circuited, voltage at a voltage detection node 9 is input to the voltage detection circuit 3 via parallel-connected voltage drop resistors 10. In the car power source apparatus of the figure, the two voltage detection lines 8 are connected to a common input line 11 and connected to the input-side of the voltage detection circuit 3 via the common input line 11. Therefore, the voltage input to the voltage detection circuit 3 is the voltage from the voltage divider formed by the series addition of the voltage divider resistor 12 ($R_1$) and the parallel-connected voltage drop resistors 10 ($R_3$), and the input resistor 13 ($R_2$). If the electrical resistance of each voltage detection line 8 voltage drop resistor 10 ($R_3$) is the same, the resistance of the parallel-connected voltage detection lines 8 is one half of that, or $R_3/2$. As a result, the voltage input to the voltage detection circuit 3 ($E_{in}$) is the voltage divided value given by the following equation.

$$E_{in} = [R_2/(R_1+R_2+R_3/2)] \times E$$

Here, E is the driving battery voltage, $R_1$ is the resistance of the voltage divider resistor, $R_2$ is the resistance of the input resistor, and $R_3$ is the resistance of the voltage drop resistor.

However, if one of the voltage detection lines 8 is open circuited, voltage drop resistors 10 are no longer connected in parallel, and voltage detection line 8 resistance becomes $R_3$. As a result, the voltage input to the voltage detection circuit 3 becomes the voltage divided value given by the following equation.

$$E_{in} = [R_2/(R_1+R_2+R_3)] \times E$$

Voltage measured by the voltage detection circuit shifts when a voltage detection line is open circuited and when it is not open circuited. If one voltage detection line is open circuited, resistance of the voltage drop resistor in series with the voltage input increases, and the voltage measured by the voltage detection circuit drops. Consequently, if a voltage detection line becomes open circuited, voltage measured by the voltage detection circuit at that voltage detection node will drop. The decision circuit detects the drop in voltage measured at the voltage detection node and determines that one voltage detection line has open circuited. The above and further objects and features of the invention will more fully be apparent from the following detailed description with accompanying drawings.

DETAILED DESCRIPTION OF THE PREFERRED EMBODIMENT(S)

Figure 1:
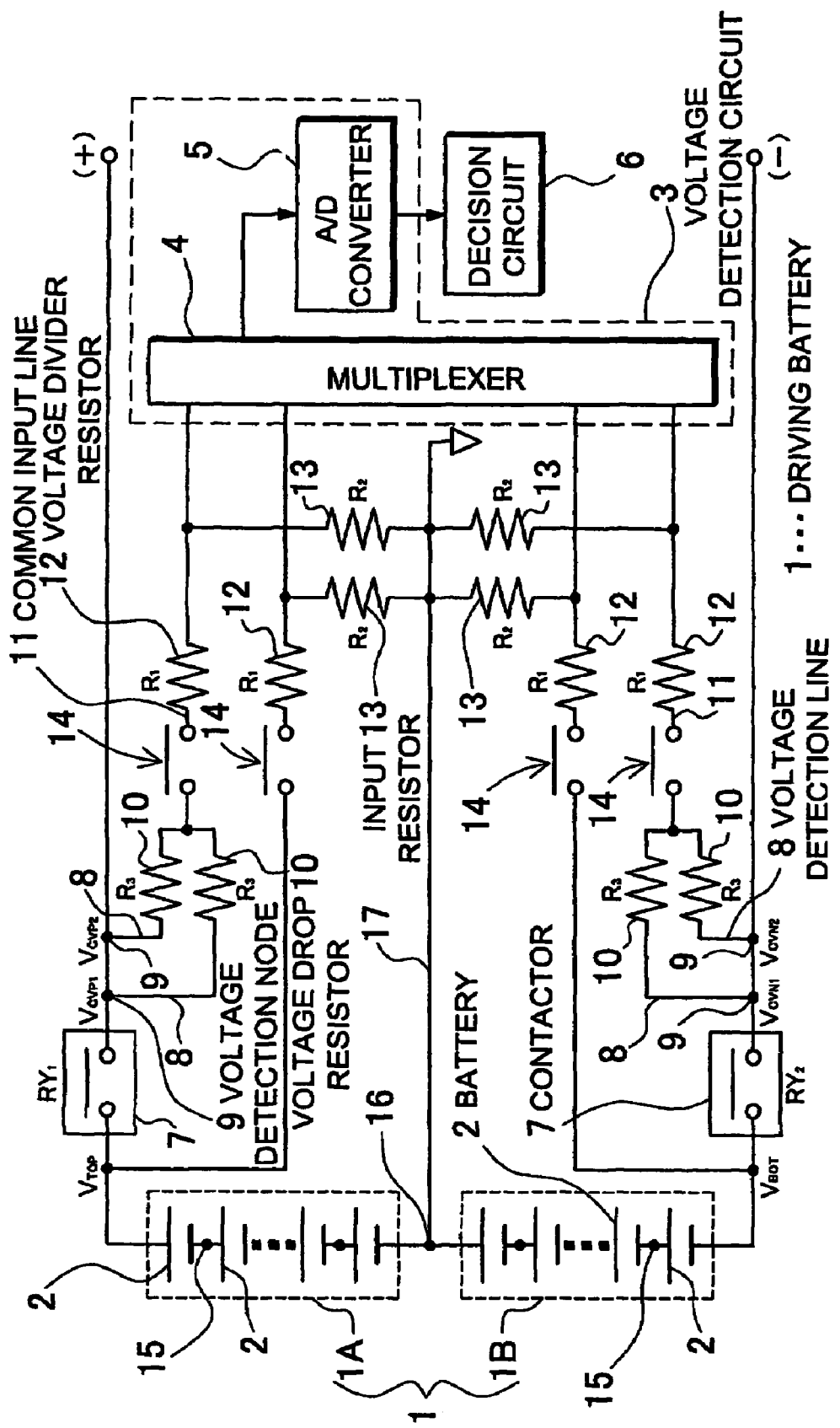
FIG. 1 is an abbreviated structural diagram of a car power source apparatus for one embodiment of the present invention.

The car power source apparatus of the present invention is provided with a driving battery that supplies power to the car's electric motor, a voltage detection circuit that measures the voltage of batteries in the driving battery, a plurality of voltage detection lines connected in parallel between the input-side of the voltage detection circuit and driving battery voltage detection nodes, and a decision circuit that determines if a voltage detection line is open circuited from the voltage measured by the voltage detection circuit. Each voltage detection line has a voltage drop resistor connected in series. The voltage detection circuit is provided with input resistors on its input-side. The car power source apparatus computes voltage measured by the voltage detection circuit, which is from the voltage drop resistor and input resistor voltage divider, to determine voltage detection line open circuit.

In the car power source apparatus of the present invention, the positive-side output and negative-side output of the driving battery can be voltage detection nodes, and voltage detection lines can connect to the input-side of the voltage detection circuit.

In the car power source apparatus of the present invention, a plurality of voltage detection lines having series connected voltage drop resistors can be connected in parallel. Those voltage detection lines can connect to the input-side of the voltage detection circuit via a common input line, and that common input line can have a series connected voltage divider resistor.

In the car power source apparatus above, a plurality of voltage detection lines are connected in parallel and connected to the input-side of the voltage detection circuit via a common input line. A voltage divider resistor is connected in series with the common input line. In this power source apparatus, the amount of voltage drop due to an open circuited voltage detection line can be adjusted to an optimum value by the size of the voltage drop resistor, which is in series with the voltage detection lines. This circuit configuration is ideally suited for detecting both a fused contactor and an open circuited voltage detection line. This is because the amount of voltage change due to a fused contactor and due to an open circuited voltage detection line can be adjusted to different values to allow detection of an open circuited voltage detection line.

The car power source apparatus of the present invention is provided with contactors connected at the output-side of the driving battery, and the voltage detection circuit can measure voltage at the output-side of the contactors via a plurality of voltage detection lines.

In the car power source apparatus above, contactors are connected to the output-side of the driving battery and the voltage detection circuit measures voltage at the output-side of the contactors via a plurality of voltage detection lines. This car power source apparatus can detect a fused closed contactor as well as an open circuited voltage detection line using the voltage detection circuit.

In the car power source apparatus of the present invention, the voltage detection circuit can detect voltage at the battery-side and at the output-side of the contactors. In the car power source apparatus above, the voltage detection circuit measures voltage at the battery-side and at the output-side of the contactors to reliably determine if a contactor has fused closed.

In the car power source apparatus of the present invention, the voltage detection circuit measures voltage at the battery-side and at the output-side of the contactors, and the decision circuit can determine from the measured voltages if a contactor is fused closed or if a voltage detection line is open circuited. In the car power source apparatus above, voltage at the battery-side and at the output-side of the contactors is measured by the voltage detection circuit, and the decision circuit determines if a contactor is fused or a voltage detection line is open from the measured voltages. In this car power source apparatus, the voltage detection circuit that detects a fused closed contactor can detect an open circuited voltage detection line. Conversely, the circuit that detects voltage detection line open circuit also detects a fused contactor. Therefore, while circuit structure is kept simple, both an open circuited voltage detection line and a fused closed contactor can be detected.

The car power source apparatus shown in FIG. 1 is provided with a driving battery 1 that is a plurality of batteries connected in series, a voltage detection circuit 3 that measures voltage of the driving battery 2, and a decision circuit 6 that determines if a voltage detection line 8 is open circuited from the measured voltage.

The driving battery 1 of the figure is provided with a positive-side battery block 1A that is a plurality of batteries 2 connected on the positive-side of the center-tap connection node 16, and a negative-side battery block 1B that is a plurality of batteries 2 connected on the negative-side of the center-tap connection node 16.

The voltage detection circuit 3 of FIG. 1 is provided with a multiplexer 4 on its input-side and an analog to digital (A/D) converter 5 connected to the output of the multiplexer 4. The multiplexer 4 switches a plurality of inputs by time-division multiplexing and outputs a plurality of node voltages to the A/D converter 5. The A/D converter 5 converts input voltage signals, which are analog signals, to digital signals and outputs them to the decision circuit 6.

The voltage detection circuit 3 of FIG. 1 measures the voltage of battery block 1A on the positive-side of the center-tap connection node 16 and the voltage of battery block 1B on the negative-side of the center-tap connection node 16 to detect the total voltage of the driving battery 1. Since a battery block is a plurality of batteries 2 connected in series, the voltage detection circuit 3 can measure the voltage of each battery, or it can measure the voltage of each battery module, which is a series connection of a plurality of batteries. In a car power source apparatus where the voltage detection circuit 3 measures the voltage of each battery or the voltage of each battery module, driving battery 1 charging and discharging is controlled using the measured battery or battery module voltages, and battery over-charging and over-discharging are prevented. Said differently, to prevent driving battery over-charging and over-discharging, the car power source apparatus is provided with a voltage detection circuit 3 to measure battery voltage or battery module voltage. The present invention uses the voltage detection circuit 3 that measures battery voltage or battery module voltage for the dual purpose of detecting an open circuited voltage detection line 8. Therefore, there is no need to provide a special purpose voltage detection circuit to detect an open circuited voltage detection line 8. Specifically, an open circuited voltage detection line 8 can be detected without providing a special purpose circuit.

The voltage detection circuit 3 of the car power source apparatus of FIG. 1 switches multiplexer 4 inputs by time-division multiplexing to measure each of the battery voltages from the positive-side battery block 1A and the negative-side battery block 1B, and output a plurality of node voltages to the A/D converter. FIG. 1 shows a circuit configuration that measures voltage only at the output-side of the driving battery 1. However, although not illustrated, a voltage detection circuit can also input connection nodes 15 of the series connected batteries 2 or connection nodes of the series connected battery modules of the driving battery 1 to the multiplexer and detect individual battery voltages or battery module voltages.

In addition to a voltage detection line 8 that is open circuited, a contactor 7 that is fused closed is also detected with voltage measured by the voltage detection circuit 3 of the car power source apparatus of FIG. 1. Consequently, the battery-sides and output-sides of contactors 7 connected to the output-side of the driving battery 1 are input to the input-side of the multiplexer 4. This voltage detection circuit 3 measures battery-side voltages and output-side voltages of the contactors 7.

The input-side of the multiplexer 4, which is the input-side of the voltage detection circuit 3, is connected to driving battery 1 voltage detection nodes 9 via a plurality of voltage detection lines 8. In FIG. 1, two voltage detection lines 8 are connected in parallel. Since contactor 7 ($RY_1$, $RY_2$) car-side voltage cannot be measured if voltage detection lines 8 are open circuited, the input-side of the voltage detection circuit 3 is connected to driving battery 1 voltage detection nodes 9 via a plurality of parallel-connected voltage detection lines 8 to allow contactor 7 ($RY_1$, $RY_2$) car-side voltage to be measured even when one voltage detection line 8 has been open circuited. In a car power source apparatus with two voltage detection lines 8 connecting the driving battery 1 to the voltage detection circuit 3, contactor 7 ($RY_1$, $RY_2$) car-side voltage can be measured even if one voltage detection line 8 becomes open circuited, and as long as both voltage detection lines 8 do not become open circuited.

To detect an open circuited voltage detection line 8, each voltage detection line 8 has a voltage drop resistor 10 ($R_3$) connected in series. Further, in the car power source apparatus of FIG. 1, a plurality of voltage detection lines 8 are connected in parallel and connected to the input-side of the voltage detection circuit 3 via a common input line 11. A voltage divider resistor 12 ($R_1$) is connected in series with this common input line 11. In general, failure rate is higher for a circuit section of wire-harness compared with a circuit section mounted on a printed circuit board. Therefore, in the configuration of FIG. 1, failure rate becomes higher for the voltage detection line 8 wire section (from the voltage detection node 9 to the voltage drop resistor 10) than for the section from the voltage drop resistor 10 to the voltage detection circuit 3.

When both voltage detection lines 8 are connected, the combined resistance of the voltage drop resistors 10 ($R_3$) in each voltage detection line 8 becomes $R_3/2$, which is half the resistance value. However, if one of the voltage detection lines 8 becomes open circuited, the combined resistance increases to $R_3$. When combined resistance becomes large, a voltage detection line 8 has an open circuit condition and the combined resistance voltage drop increases. In the car power source apparatus of FIG. 1, voltage divider resistors 12 ($R_1$) are connected in the common input lines 11. Further, the voltage detection circuit 3 has input resistors 13 ($R_2$) on its input-side. Voltage detection circuit 3 input resistors 13 ($R_2$) are connected to the input-side of the multiplexer 4. However, it is not always necessary to externally connect input resistors to the multiplexer or other circuit at the input-side of the voltage detection circuit. For example, the input resistors may also be implemented by the input impedance of the voltage detection circuit itself.

The detected voltage input to the input-side of the voltage detection circuit 3 shifts when a voltage detection line 8 is open circuited compared to when it is not open circuited. When a voltage detection line 8 is not open circuited, the voltage ($E_{in}$) input to the voltage detection circuit 3 is the voltage divided value given by equation 1 below.

$$E_{in}=[R_2/(R_1+R_2+R_3/2)]\times E \quad \text{(equation 1)}$$

When one voltage detection line 8 is open circuited, the voltage input to the voltage detection circuit 3 is the voltage divided value given by equation 2 below.

$$E_{in}=[R_2/(R_1+R_2+R_3)]\times E \quad \text{(equation 2)}$$

Figure 2:
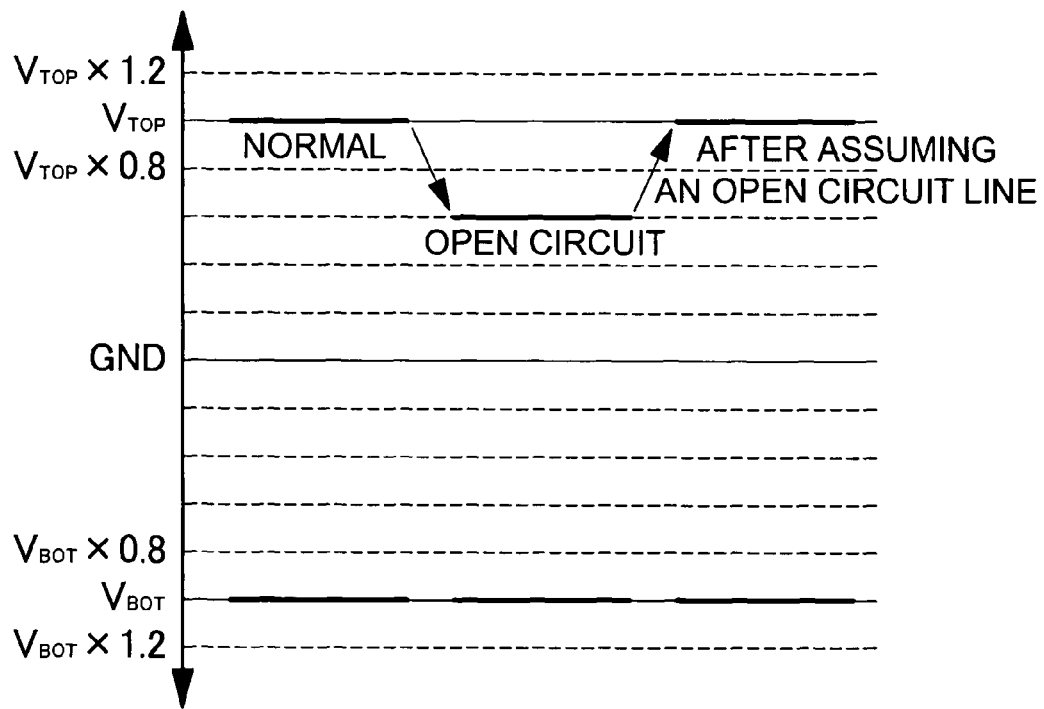
FIG. 2 is a graph showing one example of voltage shift measured by the voltage detection circuit.
Figure 3:
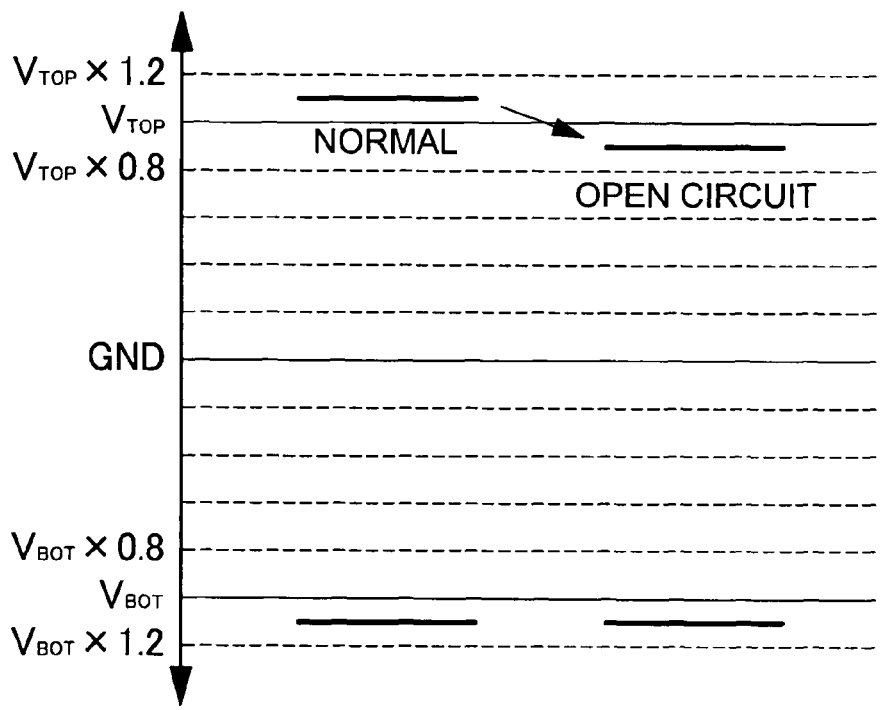
FIG. 3 is a graph showing another example of voltage shift measured by the voltage detection circuit.

The shift in voltage measured by the voltage detection circuit 3 when a voltage detection line 8 is open circuited compared to when it is not open circuited is shown in FIGS. 2 and 3. When one voltage detection line 8 becomes open circuited, the combined resistance of voltage drop resistors 10 ($R_3$) in series with the voltage input changes and the voltage divided voltage introduced to the voltage detection circuit 3 changes.

The resistance of the voltage drop resistor ($R_3$) can be made large to reliably detect an open circuited voltage detection line 8. However, in the car power source apparatus of FIG. 1, voltage measured by the voltage detection circuit 3 is not only used to detect an open circuited voltage detection line 8, but is also used to detect a contactor 7 that is fused closed.

FIGS. 2 and 3 are graphs showing detected voltage drop due to voltage detection line 8 open circuit. When a voltage detection line 8 is open circuited, the measured voltage changes as shown in FIGS. 2 and 3 depending on the size of the voltage drop resistor 10 ($R_3$), and more precisely depending on the electrical resistance of the voltage drop resistor 10 ($R_3$), the voltage divider resistor 12 ($R_1$), and the input resistor ($R_2$).

FIG. 2 shows the situation when the voltage drop resistor 10 ($R_3$) is made large and the measured voltage drop is large when a voltage detection line 8 is open circuited. In this figure, the positive-side voltage $V_{top}$ and the negative-side voltage $V_{bot}$ of the driving battery 1 each have decision limit values of ±20%. If the positive-side voltage $V_{CVPn}$ or the negative-side voltage $V_{CVNn}$ at output-sides of the contactors is above or below the range of the decision limits, a contactor is considered to be open.

In this figure, if one of the voltage detection lines 8 that measures contactor output-side voltage $V_{CVP1}$ is open circuited, the voltage detection circuit 3 computes voltage with equation 1 and implements processing according to the voltage divider ratio of equation 1 as condition 1. Since the measured voltage under this condition is below the lower limit $V_{top} \times 0.8$, a contactor 7 ($RY_1$) is considered open. At this time, an open contactor decision triggers change to condition 2, where voltage is computed according to the voltage divider ratio of equation 2, and decisions are reassessed under that condition. If the voltage is still outside the decision limits even when assuming the voltage divider ratio of condition 2, the contactor 7 (RY1) is judged open for the first time. If the voltage does not exceed decision limits, the contactor 7 is not judged open, but the voltage detection line 8 is judged to have an open circuit.

FIG. 3 shows the situation when the voltage drop resistor 10 ($R_3$) is made small and the measured voltage drop is small when a voltage detection line 8 is open circuited. As shown in this figure, when the resistance of the voltage drop resistor 10 is made smaller, the proportional voltage drop for an open circuited voltage detection line 8 becomes smaller. In this figure as well, decision limits are $V_{top} \pm 20\%$ and $V_{bot} \pm 20\%$, and when $V_{CVPn}$ or $V_{CVNn}$ exceed those limits, a contactor 7 ($RY_1$ or $RY_2$) is assumed open.

Under normal conditions, while within decision limits, $V_{CVPn}$ is measured somewhat higher than the true value by setting the software voltage divider ratio somewhat higher than the hardware value. If the voltage detection line 8 that detects the voltage $V_{CVP1}$ is open circuited, the circuit voltage divider ratio is automatically somewhat high, and the voltage is within the decision tolerance range (±20%). For example, voltage change can be designed to be ±5%. This design value can be realized by making the voltage drop resistors 10 ($R_3$) small. Here, the open or closed state of the contactors 7 and voltage detection line 8 open circuit can be accurately determined by continuously using only the initial voltage divider ratio. There is no need to use two voltage divider ratios for software processing of the measurements.

To make the voltage drop due to an open circuited voltage detection line 8 small as shown in FIG. 3, the resistance of the voltage drop resistor 10 is made small. When the resistance of the voltage drop resistor 10 is decreased, the proportional drop in voltage resulting from an open circuited voltage detection line 8 becomes smaller. Specifically, the magnitude of the variation in measured voltages for the situation shown in FIG. 3 decreases from the situation shown in FIG. 2. When a hybrid car is driven, the voltage of its driving battery 1 fluctuates frequently. In such a case, detected voltage can exceed contactor 7 decision limits (±20%) when a contactor 7 is not open and a voltage detection line 8 is not open circuited. In such a case, an incorrect decision can be generated. Consequently, for a circuit with small voltage shift for an open circuited voltage detection line 8, as shown in FIG. 3, voltage detection line 8 open circuit decision errors can be reduced by making those decisions during conditions when charging and discharging currents are not generated frequently.

A circuit with small voltage change for an open circuited voltage detection line 8, as shown in FIG. 3, is effective for production test after driving battery 1 manufacture and just before shipping. This is because the driving battery 1 is not charged or discharged in this situation and voltage variations are relatively small other than those caused by an open contactor 7 or a voltage detection line open circuit.

The following two conflicting assumptions are often made for a circuit, and method of detecting driving battery 1 voltage and determining voltage detection line 8 open circuit.

(a) In confirming proper assembly at the time of manufacture under conditions of no charging and discharging, it is desirable to confirm that voltage detection line open circuit can be detected with sufficiently high precision.

(b) To avoid easily causing failure after shipping, it is desirable to allow driving battery 1 charging and discharging even when a voltage detection line 8 is open circuited. (Regardless if there is an open circuit or not, if voltage detection can take place with the same computing equation, the software can be programmed easily.)

Since stable voltage detection is possible at production test of the car power source apparatus of the present invention, the test equipment can accurately determine the precision of measured voltages when determining if a voltage detection line 8 is open circuited. Voltage detection line 8 open circuit can be reliably detected without making the product complex. Further, since the voltage detection circuit 3 of the present invention serves the dual purpose of detecting voltage detection line open circuit, the number of multiplexer 4 channels does not need to be increased and the parts list does not need to be increased to determine voltage detection line 8 open circuit.

In the car power source apparatus shown in FIG. 1, the voltage of battery block 1A on the positive-side relative to the center-tap connection node 16 and the voltage of battery block 1B on the negative-side relative to the center-tap connection node 16 are switched and detected by the multiplexer 4. In this car power source apparatus, the positive-side voltage detection lines 8 and the negative-side voltage detection lines 8 can be separately measured. The center-tap connection node 16 is connected to the reference input terminal (not illustrated) of the voltage detection circuit 3 via a reference connection line 17. The reference connection line 17 becomes the ground-line of the voltage detection circuit 3. However, the reference connection line 17, which becomes the voltage detection circuit 3 ground-line, is not connected to the car chassis ground. This is to prevent electric shock.

The voltage detection circuit 3 has detection switches 14 connected at its input-side. Detection switches 14 are turned on during voltage detection with the ignition switch on, and are switched off when the ignition switch is turned off.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims. The present application is based on Application No. 2006-270189 filed in Japan on Sep. 30, 2006, the content of which is incorporated herein by reference.

What is claimed is:

1. A car power source apparatus comprising:
   a driving battery that supplies power to the car's electric motor, the driving battery having voltage detection nodes;
   a voltage detection circuit that measures the voltage of batteries in the driving battery;
   a plurality of voltage detection lines connected in parallel between the input-side of the voltage detection circuit and the voltage detection nodes of the driving battery; and
   a decision circuit that determines if a voltage detection line is open circuited from the voltage measured by the voltage detection circuit,
   wherein each voltage detection line has a voltage drop resistor connected in series, and the voltage detection circuit has input resistors on its input-side, and
   wherein the voltage detection circuit measures voltage from the voltage divider formed by the input resistor and voltage drop resistors, and the decision circuit detects open circuit of the voltage detection line from the measured voltages.

2. A car power source apparatus as recited in claim 1 wherein voltage detection lines connect the positive-side output and negative-side output of the driving battery, as voltage detection nodes, to the input-side of the voltage detection circuit.

3. A car power source apparatus as recited in claim 1 wherein a plurality of voltage detection lines, which have series-connected voltage drop resistors, are connected in parallel, and are connected to the input-side of the voltage detection circuit via a common input line; and wherein a voltage divider resistor is connected in series with the common input line.

4. A car power source apparatus as recited in claim 1 wherein contactors are connected to the output-side of the driving battery, and the voltage detection circuit measures voltages at the output-sides of contactors via a plurality of voltage detection lines.

5. A car power source apparatus as recited in claim 4 wherein the voltage detection circuit measures voltages at the battery-side and the output-side of the contactors.

6. A car power source apparatus as recited in claim 5 wherein the voltage detection circuit measures voltages at the battery-side and the output-side of the contactors, and the decision circuit determines if a contactor is fused closed or a voltage detection line is open circuited from the measured voltages.

7. A car power source apparatus as recited in claim 6 wherein the decision circuit compares measured voltages with decision limit values and determines an open contactor when measured values exceed the decision limits.

8. A car power source apparatus as recited in claim 6 wherein the decision circuit determines if a voltage detection line is open circuited and if a contactor is open or closed from the measured voltages.

9. A car power source apparatus as recited in claim 1 wherein the voltage detection circuit is provided with a multiplexer and an A/D converter, and multiplexer input is switched by time-division multiplexing to output voltages at a plurality of nodes to the A/D converter.

10. A car power source apparatus as recited in claim 1 wherein two voltage detection lines are connected in parallel.

11. A car power source apparatus as recited in claim 1 wherein the input resistors are the input impedance of the voltage detection circuit.

12. A car power source apparatus as recited in claim 1 wherein the voltage detection circuit has detection switches connected to its input-side, and these detection switches are switched on during voltage detection.

13. A car power source apparatus as recited in claim 1 wherein the decision circuit determines if voltage detection lines are open circuited at production test after driving battery manufacture and just before shipping.

* * * * *